(12) United States Patent
Jaspers et al.

(10) Patent No.: US 6,697,110 B1
(45) Date of Patent: Feb. 24, 2004

(54) COLOR SAMPLE INTERPOLATION

(76) Inventors: Cornelis A. M. Jaspers, Prof. Holstlaan 6, 5656 AA Eindhoven (NL); Eric Delage, 4 Venelle de Lórme, 14000 Caen (FR); Eric Hostiou, Phillipe, 14790 Verson (FR)

(*) Notice: Subject to any disclaimer, the term of this patent is extended or adjusted under 35 U.S.C. 154(b) by 0 days.

(21) Appl. No.: 09/116,323

(22) Filed: Jul. 15, 1998

(30) Foreign Application Priority Data

Jul. 15, 1997 (EP) ............................................. 97401700

(51) Int. Cl.⁷ ............................. H04N 3/14; H04N 5/335
(52) U.S. Cl. ...................... 348/272; 348/275; 348/223.1
(58) Field of Search ................................. 348/272, 273, 348/274, 275, 277, 280, 268, 242, 675, 222.1, 223.1, 225.1, 228.1; 382/162, 163, 167, 312

(56) References Cited

U.S. PATENT DOCUMENTS

| | | | | |
|---|---|---|---|---|
| 5,008,739 A | * | 4/1991 | D'Luna et al. ............. | 348/675 |
| 5,038,216 A | * | 8/1991 | Easterly et al. ............ | 348/364 |
| 5,065,229 A | * | 11/1991 | Tsai et al. ................. | 348/391.1 |
| 5,119,180 A | | 6/1992 | Okamoto ..................... | 358/41 |
| 5,251,019 A | * | 10/1993 | Moorman et al. .......... | 348/275 |
| 5,333,055 A | | 7/1994 | Murata et al. .............. | 348/239 |
| 5,373,322 A | * | 12/1994 | Laroche et al. ............ | 348/273 |
| 5,374,956 A | * | 12/1994 | D'Luna ...................... | 348/275 |
| 5,382,976 A | * | 1/1995 | Hibbard ..................... | 348/273 |
| 5,398,058 A | * | 3/1995 | Hattori .................... | 348/228.1 |
| 5,418,565 A | * | 5/1995 | Smith ....................... | 348/273 |
| 5,475,769 A | * | 12/1995 | Wober et al. .............. | 382/167 |
| 5,528,292 A | * | 6/1996 | Ikeda ....................... | 348/273 |
| 5,541,653 A | * | 7/1996 | Peters et al. ............. | 348/264 |
| 5,629,734 A | * | 5/1997 | Hamilton, Jr. et al. ..... | 348/272 |
| 5,652,621 A | * | 7/1997 | Adams, Jr. et al. ........ | 348/272 |
| 5,917,556 A | * | 6/1999 | Katayama ................. | 348/223.1 |
| 6,263,102 B1 | * | 7/2001 | Jaspers ..................... | 382/162 |

\* cited by examiner

Primary Examiner—Aung Moe
(74) Attorney, Agent, or Firm—Edward W. Goodman

(57) ABSTRACT

In a method of interpolating a color sample in a signal (RGBin) having alternately colored samples, the missing color sample is interpolated in dependence upon neighboring color samples (G1, G2, G3, G4) of the same color (G) as the color sample to be interpolated, and a differently colored sample (R/B) from the same location as the color sample to be interpolated.

3 Claims, 9 Drawing Sheets

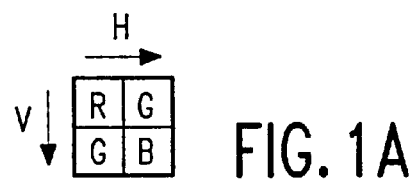
FIG. 1A
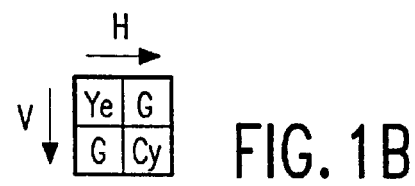
FIG. 1B
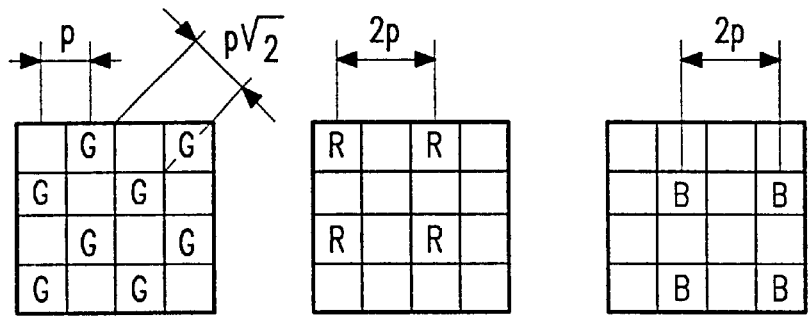
FIG. 2
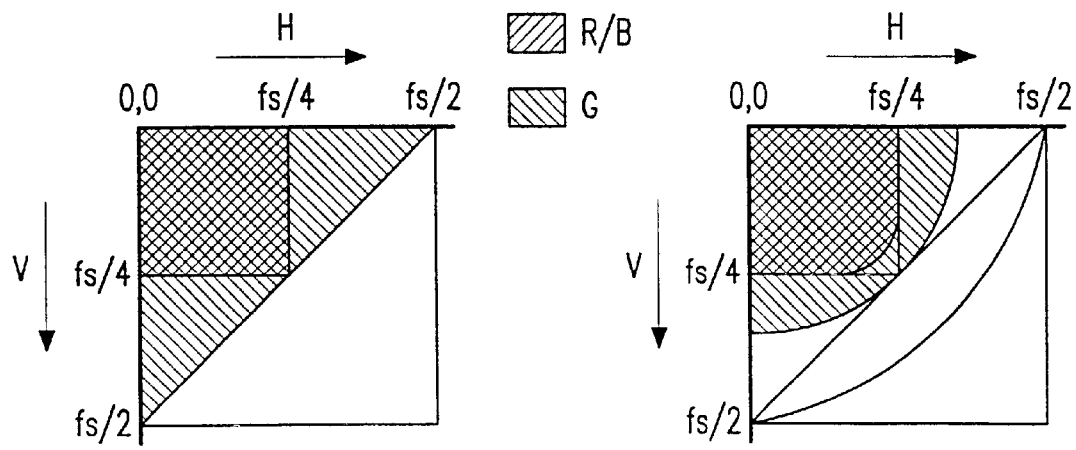
FIG. 3A
FIG. 3B

COLOR SAMPLE INTERPOLATION

BACKGROUND OF THE INVENTION

The invention relates to a method of and a device for interpolating a color sample in a signal having alternate colored samples, and to a camera comprising such a device.

SUMMARY OF THE INVENTION

It is, inter alia, an object of the invention to provide an interpolation aimed at furnishing a high color signal resolution. To this end, first and second aspects of the invention provide an interpolation method and an interpolation device for interpolating a color sample in a signal having alternately colored samples. A third aspect of the invention provides a camera including such an interpolation device.

In a method of interpolating a color sample in a signal having alternate colored samples in accordance with a primary aspect of the present invention, the missing color sample is interpolated in dependence upon neighboring color samples of the same color as the color sample to be interpolated, and a differently colored sample from the same location as the color sample to be interpolated.

These and other aspects of the invention will be apparent from and elucidated with reference to the embodiments described hereinafter.

BRIEF DESCRIPTION OF THE DRAWINGS

In the drawings:

FIGS. 1A and 1B show an RGB and a YeGCy Bayer filter, respectively;

FIG. 2 shows the sample structure of the RGB pixels and the pitch of the GRB colors obtained by an RGB Bayer filter;

FIGS. 3A and 3B show a theoretical and a more realistic Nyquist domain of an RGB Bayer filter, respectively;

DESCRIPTION OF THE PREFERRED EMBODIMENTS

Figure 4:
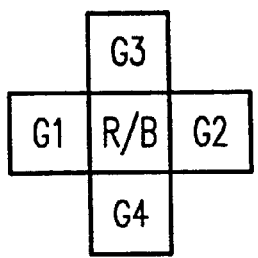
FIG. 4 shows a red or blue pixel at the position of a missing green pixel.

FIG. 1A shows the color filter array of an RGB Bayer image sensor, and FIG. 1B shows the corresponding array for a YeGCy Bayer image sensor, where Ye is yellow, and Cy is cyan. In the YeGCy Bayer filter, Red is replaced by Yellow, and Blue by Cyan, in comparison with the RGB Bayer filter. In FIG. 1, H and V indicate the horizontal (columns) and vertical (rows) directions, respectively. It has been assumed that the sensor has square and contiguous pixels. This means that the resolution has become independent of the aspect ratio of the sensor and that the modulation transfer characteristic in the horizontal and the vertical direction is the same for each color.

FIG. 2 shows the sample structure of the RGB pixels and the pitch of the GRB colors. The pitch p is the distance between two neighboring pixels having the same color. Its inverse value represents the pixel or system clock frequency in the case of a single RGB output of the sensor, i.e., fs=1/p. The sample frequency of each RGB color is inversely proportional to the shortest distance between the pixels of each RGB color, i.e. a horizontal and vertical sample frequency of $\frac{1}{2}p=fs/2$ for the Red and Blue colors, and a diagonal sample frequency of $1/p\sqrt{2}=fs/\sqrt{2}$ for Green.

For the sampled image, it holds that the frequency spectrum of each color is repeated at multiples of the sample frequency of each color. The multiple sample frequencies are located at equal distances in a two-dimensional array. FIGS. 3A and 3B show the Nyquist domain corresponding to such an array with a very limited number of sample frequency points, because this number is theoretically infinite. In order to avoid aliasing, each spectrum around a sample frequency point should not overlap with the spectrum of its neighbor sample frequency points. If this is true, the Nyquist theorem is fulfilled, i.e., the incoming frequencies of the scene, supplied via the optical system and the integrating light-sensitive part of a pixel, should be lower than half the sample frequency of each color. Frequencies supplied outside this Nyquist domain will certainly cause aliasing. This means that the maximal resolution of each color is determined by half the sample frequency of each color. For Red and Blue, the maximum resolution in the horizontal and vertical directions is, therefore fsRB/2=fs/4, and $\sqrt{2}*fs/4$ in the diagonal direction. For Green, the diagonal resolution has a maximum of $fsG/2=fs/\sqrt{2}$ and fs/2 in the horizontal and vertical directions. Because of their symmetry, the Nyquist domains of the Red, Blue and Green colors can be drawn in a single diagram, showing only a quarter. R/B indicates the Red/Blue domain and G indicates the Green domain. The desired domain is indicated by the ¼ circle, while the full square corresponds to the domain of a 3 CCD camera.

It is possible to compare the Nyquist domain of a single RGB Bayer sensor with the square domain of a 3 CCD camera in which each sensor has the same sampling frequency 'fs' as the Bayer sensor. Since the human eye has a rotationally symmetrical resolution, a more realistic domain for comparison purposes is the circular shape. This desired domain can be regarded as being representative of a full VGA or XGA, or any other format, for each RGB color.

As has been illustrated in FIG. 3B, it appears that the color Green near the Nyquist frequency fs/2 does not truly fulfil the idea of the Nyquist theorem, i.e., there are clearly visible distortions. The same can be seen for the Red and Blue sampled colors, but then in the diagonal direction. The most annoying aspect is that no distinction of a direction is possible: the original scene may consist of horizontal and vertical lines. Considering the amount of aliasing of a sampled zoneplate, a better approximation of a new domain is shown in FIG. 3B. At the new border, only a small amount of aliasing can be noticed. Near the old border, the amount of aliasing increases.

The conclusion is that the Red and Blue signals, but especially the Green signal offer less resolution than is suggested by the Nyquist theorem. The amount of Green aliasing near fs/2 can be accepted as is, or may be reduced by applying an optical low-pass filter, one for each H- and V-direction. However, this is rather expensive and will cause resolution losses as well. The diagonal aliasing reduction of Red, Green and Blue is not further discussed here.

In accordance with a primary aspect of the present invention, the Green resolution is improved near fs/2, in the horizontal and vertical directions, by what will hereinafter be referred to as the Smart Green processing. The resolution loss of Green as shown in FIG. 3B is restored to the original expected Nyquist domain of FIG. 3A. Smart Green does not act in the diagonal directions.

The algorithm for smart Green is based on the fact that resolution losses are best observed in high-frequency white or near white scenes and less in colored scenes. With this in mind, the contribution of Red and Blue can help to determine the reconstruction of the white or near-white high-frequency parts near fs/2. It is no objection that Red and Blue produce their maximum of aliasing near fs/2. All colored pixels are handled as black and white pixels when determining the value of the missing Green pixel. For this purpose, two algorithms are applied: one algorithm sorting data and the other fading data.

FIG. 4 shows the definition of the pixels surrounding the missing Green pixel (R/B). This missing Green configuration is not only found in RG/GB Bayer sensors, but also in RGG/GGB and RGGG/GGBG sensor type. All of them have the same missing pixel problem, so the smart Green algorithm can also be applied for these color filter arrays.

The following variables are used:

G12=(G1+G2)/2

G34=(G3+G4)/2

SigmaG=(G12+G34)/2, the average green value

RBc: the Red or Blue value of the center pixel

SmartGawbR,

SmartGawbB: Smart Green white balance (and matrix) parameters, the default value is 1.0

SmartGainR,

SmartGainB: extra gain for RBc for a more symmetrical near-white area, the default value is 1.0 minG: the minimum denominator value for the fade algorithm fade: the fader value for the missing Green pixel smartG: the interpolation result A very attractive smart Green method especially for digital signal processing is offered by sorting the data of G12, G34 and RBc in order of magnitude. The center value of the sorted sequence, or in other words, the median value will be applied for the reconstruction of the missing Green pixel. Thus, smartG=median{G12, G34, RBc}

The RBc values for a Red and Blue center pixel are:

RBc=SmartGainR*SmartGawbR*Red value

RBc=SmartGainB*SmartGawbB*Blue value.

Note that the product of SmartGainX and SmartGawbX can be sent as one parameter by means of a controller to the multiplier which calculates RBc. The need for applying SmartGainX and SmartGawbX is explained below. Moreover, it will become clear why the smart Green processing can only reconstruct the missing Green pixel for near-white colors.

A more complex method, with the same results as the sorting algorithm, is offered by the fading algorithm. The default fade value is set at 0.5, resulting in a missing pixel reconstruction which is equal to the average Green value sigmaG when there is no smartG fade action. For RBc, the very same holds as what has been set out above, and the direction for resolution improvement is determined with the aid of this RBc value.

First, the situation is judged for G12>G34, then if G12-sigmaG>minG, then fade=0.5*(1+(RBc-sigmaG)/(G12-sigmaG));

if fade>1 then fade=1 else if fade<0 then fade=0

SmartG=fade*G12+(1-fade)*G34 else smartG=sigmaG

For the calculation of fade and smartG, it holds that:

if RBc>sigmaG, then white dominance (=vertical resolution improvement), and if RBc<sigmaG, then black dominance (=horizontal resolution improvement), but if RBc=sigmaG, then smartG=sigmaG.

It will not be difficult to imagine that this direction detection algorithm will function satisfactorily for near-white signals, where R, G and B have approximately the same values. For more saturated colors, the reconstruction will start to fail, but from a perceptive point of view, near-white, high-frequency parts will be much better observed than highly saturated high-frequency parts. This is what makes the smart Green algorithm very attractive for application with the illustrated configuration of a missing Green pixel.

The use of a fader guarantees that, as a function of G12, G34 and RBc, a sliding result will be achieved for the missing Green pixel. This means that there is no abrupt and clearly visible deviation from the surrounding Green pixels and that the distortion of the reconstructed pixels will be minimized. Note, however, that in spite of a fader, the result of the sorting algorithm is the same. With a two-dimensional zoneplate as a scene, the sliding control by the fader can clearly be seen from the almost complete absence of interference near the fs/2 frequencies.

One of the contributions of the sliding fading algorithm is achieved by subtracting sigmaG from RBc and G12, defining the fader position based on AC values. At first glance, this may be rather strange for the (RBc-sigmaG) parameter, but not for colors near white. An experiment with the averaged surrounding RBc pixels, using (RBc-sigmaRBc) instead of (RBc-sigmaG), failed in the reconstruction of the missing Green pixel.

Analogous to the description above, for the situation where G34>G12, it holds that:

if G34-sigmaG>minG, then fade=0.5*(1+(RBc-sigmaG)/(G34-sigmaG))

if fade>1 then fade=1 else if fade<0 then fade=0 smartG=fade*G34+(1-fade)*G12

For the calculation of fade and smartG, it holds that if RBc<sigmaG then black dominance (−vertical resolution improvement), and if RBc>sigmaG then white dominance (=horizontal resolution improvement), but if RBc=sigmaG then smartG=sigmaG.

The parameter minG should limit the denominator for the calculation of the fade value. For minG, which is, for example, 1/16 of 100 IRE full scale amplitude, the worst case divider action can become (1−1/16)/1/16, thus about 16 times amplification if RBc=100 IRE.

It is of course possible to limit the amount of amplification to, for example, about 8. In that case, minG becomes 1/8 of 100 IRE. But in accordance with PC simulations, a minG value of 1/8 is, however, just acceptable as far as the amount of distortion in the reconstructed Green signal is concerned.

Furthermore, it holds that, due to this just acceptable distortion, minG should be proportional to the total modulation transfer at fs/2. With a total modulation transfer amplitude of, for example, 50% at fs/2, minG should thus be 0.5*1/8, i.e., 1/16 of 100 IRE for a distortion which is just acceptable.

Several fader characteristics as a function of the RBc value of the R/B center pixel, at a certain value of G12 and G34, are possible.

A simpler fader algorithm was also examined with the aid of simulation software. In comparison with the previously discussed algorithm, it causes more distortions in the reconstructed smartG signal, is less accurate for smaller signal amplitudes and has a smaller near-white area. For this simpler fader algorithm, it holds that fade=0.5*RBc/sigmaG.

Figure 5A:
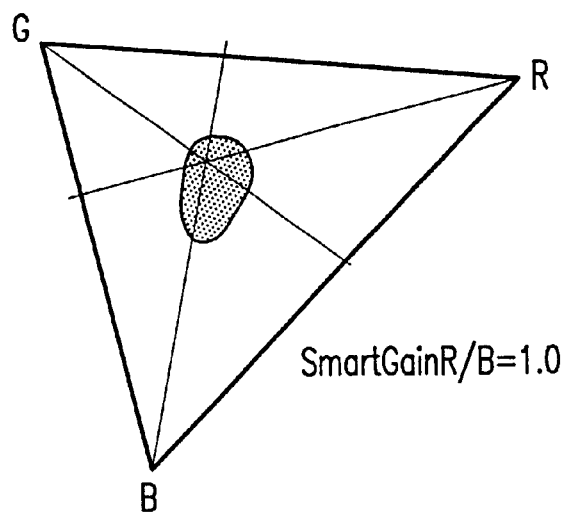
FIGS. 5A and 5B show the near-white area for two different values of the parameters SmartGainR and SmartGainB.
Figure 5B:
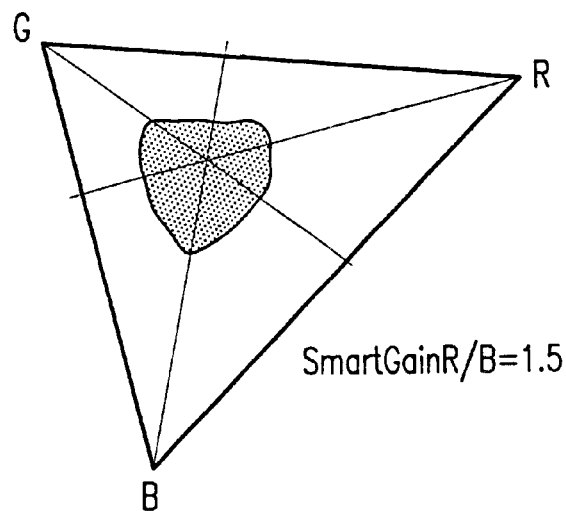

The near-white area of smartG is understood to be the area in the color domain where the Green reconstruction acts satisfactorily. FIG. 5A shows the RGB color gamut with the near-white area. Although it is a sliding algorithm, smartG outside this area will be rather quickly equal to sigmaG, the average Green value. In order to achieve a more symmetrical area, the SmartGainR and SmartGainB parameters are increased from 1.0 to 2.0, resulting in the near-white area in FIG. 5B.

To judge the effective smartG near-white area, a 2D zoneplate is applied. By varying the RGB amplitudes, an estimation can be given as to what level smartG acts satisfactorily. For pure white, the amplitude range is very large for a good smartG performance and can be varied from at least 10% to 100%. The problem is, however, the spread in amplitudes, resulting in a limited and asymmetrical area in the RGB color domain. The area can be adjusted to a more symmetrical one by means of SmartGainR/B.

For a satisfactorily functioning smartG processor, i.e., acting near white, it is preferred that the Red and Blue values in the RBc variable are corrected with the respective white balance gain factors awbR and awbB, i.e., SmartGawbR=awbR and SmartGawbB=awbB. Depending on the location of the white balance correction, two block diagrams are possible for implementing the smartG processing.

Figure 6A:
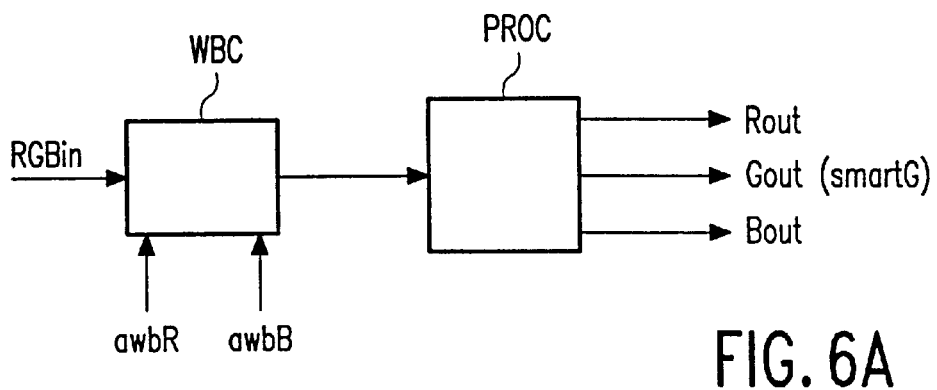
FIGS. 6A and 6B show two configurations of a white balance control circuit and an RGB processor in accordance with the present invention.

In FIG. 6A, the white balance correction WBC is performed before the reconstruction of the RGB colors. The reconstruction of the RGB colors is carried out in a processor PROC which interpolates the RGB output signals Rout, Gout, Bout in known manner with regard to the red and blue color samples, and, in accordance with the present invention, with regard to the green samples. Note that the method of FIG. 6A can be used for RGB color filter arrays only, and cannot be used for complementary arrays like YeGCy arrays. In that case, the white balance correction can be effected in the analog signal path of the correlated double sampling (CDS) and A/D conversion (ADC) circuit (offering a better quantization performance of the digital signal), or in the digital path after the ADC. For this white balance method, the SmartGawbR/B parameters are equal to 1.0 and do not need to be controlled.

Figure 6B:
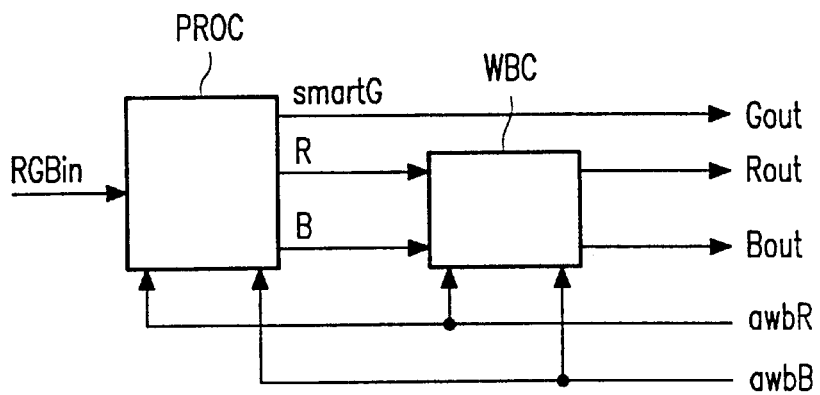

FIG. 6B shows a white balance correction WBC after the RGB and smartG processing by the processor PROC. In this case, the parameters SmartGawbR and SmartGawbB must be equal to the white balance Red and Blue gain controls awbR and awbG, respectively, for a satisfactory smartG processing operation.

For a YeGCy Bayer array, similarly as for the RGB Bayer array, the algorithm for smart Green is based on the fact that resolution losses are best observed in high-frequency near-white scenes and less in colored scenes. With this in mind, the contribution of Yellow and Cyan, instead of Red and Blue of the RGB Bayer array, can help to determine the direction of the white or near-white high-frequency parts near fs/2.

If it is supposed that for near-white the RGB contributions of the YeGCy Bayer array are equal, then it holds that Ye is about 2G, which is about Cy, as the maximum amount of electrons in Ye and Cy may be about twice as large as in the RGB Bayer array. For both, SmartGawbR and SmartGawbB being about 0.5 (instead of 1.0 for the RGB Bayer array), the RBc value for Yellow or Cyan will be approximately equal to the amplitude of Green, because RBc=SmartGawbR*Ye or RBc=SmartGawbB*Cyan. By calculating SmartGawbR/B as a function of awbR/R, the very same smart Green algorithm can be applied as described above.

It will be evident that, for complementary color arrays, the white balance (FIG. 6B) succeeds the smart Green processing instead of preceding it, because the Red and Blue signals are only available after the subtraction of Ye−G and Cy−G. For a smart Green processing functioning satisfactorily in a wide color temperature range, the proper SmartGawbR/B values are required. If the awbR and awbB parameters are known, these values can be calculated as follows by means of the controller.

SmartGawbR=1/(1+1/awbR), and

SmartGawbB=1/(1+1/awbB).

Preferably, the parameters SmartGawbR/B do not only cover the automatic white balance of the camera, but also take the effects of the camera's color matrix into account. The corrections for white balance and matrix can be summarized as follows:

1. RGB Bayer sensor
   1.1 with white balance before the RGB processor PROC:
   SmartGawbR=1.0, SmartGawbB=1.0 (see FIG. 6A)
   1.2 with white balance after the RGB processor PROC:
   SmartGawbR=awbR, SmartGawbB=awbB (see FIG. 6B)
   1.3 with white balance before the RGB processor RGBproc and a matrix after the RGB processor PROC:
   SmartGawbR=EGiwb/ERiwb, SmartGawbB=EGiwb/EBiwb in which EGiwb, ERiwb and EBiwb are derived by means of the following matrix multiplication:

$$\begin{matrix} ERiwb \\ EGiwb \\ EBiwb \end{matrix} = \begin{matrix} 1 \\ 1 \\ 1 \end{matrix} \times \begin{matrix} b11 & b12 & b13 \\ b21 & b22 & b23 \\ b31 & b32 & b33 \end{matrix}$$

in which the matrix coefficients b11 thru b33 form the inverse matrix coefficients of the RGB matrix coefficients a11 thru a33 used in the camera signal processing. However, if false colors occur (to be discussed below), the camera matrix coefficients need to be adapted as follows:

a11=a11 a12=a12*awbR a13=a13*awbR a2x=a2x (no adaptations to the green matrix coefficients)
a31=a31*awbB
a32=a32*awbB
a33=a33

1.4 with white balance and matrix after the RGB processor PROC:
SmartGawbR=EGiwb/ERiwb, SmartGawbB=EGiwb/EBiwb, in which EGiwb, ERiwb and EBiwb are derived by means of the following matrix multiplication:

$$\begin{array}{c} ERiwb \\ EGiwb \\ EBiwb \end{array} = \begin{array}{c} 1/awbR \\ 1 \\ 1/awbB \end{array} \times \begin{array}{ccc} b11 & b12 & b13 \\ b21 & b22 & b23 \\ b31 & b32 & b33 \end{array}$$

2. YeGCy Bayer sensor 2.2 with white balance after the RGB processor PROC (as discussed above):
SmartGawbR=1/(1+1/awbR), SmartGawbB=1/(1+1/awbB)

2.4 with white balance and matrix after the RGB processor PROC:
SmartGawbR=EGiwb/ERiwb, SmartGawbB=EGiwb/EBiwb, in which:

$$\begin{array}{c} ERiwb \\ EGiwb \\ EBiwb \end{array} = \begin{array}{c} 1/awbR \\ 1 \\ 1/awbB \end{array} \times \begin{array}{ccc} b11 & b12 & b13 \\ b21 & b22 & b23 \\ b31 & b32 & b33 \end{array}$$

and subsequently the following corrections are applied:
ERiwb=ERiwb+EGiwb
EBiwb=EBiwb+EGiwb.

A false color killer starts with a detection algorithm using the neighboring pixels. For the RGB Bayer color array, this will result in only one detector type which is then able to eliminate only half of the colored aliasing. This detector needs the presence of Green and its diagonal by surrounding Green pixels. The second half of the amount of aliasing can only be eliminated with the aid of the smart Green reconstructed missing Green pixel. With the aid of these two false color detectors, most Red and Blue aliasing components can be eliminated.

Figure 7A:
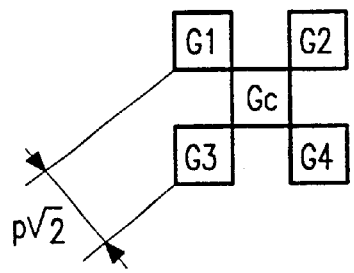
FIGS. 7A and 7B show the nearest surrounding green pixels and the sample pitch when the center green pixel is present and reconstructed by means of the smart green algorithm, respectively.
Figure 7B:
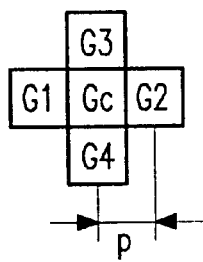

The smallest possible detection area should be applied for the detection of false colors. For the RGB Bayer array, this results in two different areas: one for the location where Green is present and one for the location where Green is absent, but where the reconstructed smart Green is available. FIGS. 7A and 7B show, for both situations, the smallest detection area and the declaration of the nearest surrounding Green pixels. Differences between both detectors concern the addressing of G1 thru G4 and the retrieval of the present center Green pixel Gc or the reconstructed smart Green pixel. For the sake of simplicity, this smart Green pixel is also defined as Gc. Another difference between both detectors is determined by the sample pitch with reference to the surrounding pixels: $p\sqrt{2}$ for the presence of Gc and p for the absence of Gc. For both detectors it holds that:

SigmaG=(G1+G2+G3+G4)/4, the average Green value.

The false color detection condition is fulfilled if
abs(Gc-sigmaG)>FCgain*FClevel.

The FClevel value depends on the total modulation depth near fs/2 caused by the lens, a possible optical low-pass and the sinc function of the light-sensitive window of the pixel. The FClevel should therefore be adjustable as a function of the total modulation depth of each camera type at fs/2.

The FCgain value is theoretically proportional to the sample pitch $p\sqrt{2}$ when Gc is present and to p when Gc is absent. Simulations showed that an FCgain value of 2 is better than $\sqrt{2}$ when preventing undesired false color killing if Gc is present. If Gc is absent, then FCgain is unity.

If the false color detection condition is fulfilled, then a boolean referred to as "falsecolor" is set to be true. If this condition is not fulfilled, this boolean is set to be false. The falsecolor boolean, if true, is used for the false color elimination action itself and also for the calculation of the fader value when the false color elimination is executed with a fader. If the falsecolor detection boolean is set to be true, then two methods at two locations are possible for eliminating the false colors. The first method relates to a hard switching color killer, the second is a fading version.

The first location is the same as where the smartG processing takes place, the other one is located where the luminance signal Y and the (low-pass filtered) color difference signals R-Y and B-Y are available. The following overview shows the False Color elimination possibilities FC1 thru FC4, each of which will be elucidated below.

FC1: eliminate by switching at location SmartG

FC2: eliminate by fading at location SmartG

FC3: eliminate by switching at location Y, R-Y, B-Y

FC4: eliminate by fading at location Y, R-Y, B-Y

FC1: False Color Elimination by Switching at the SmartG Location

With the white balance control before the smart Green processing and the falsecolor boolean set true, it holds for the elimination action that Red=Gc and Blue=Gc. In accordance with simulations, the FClevel should be adjusted to $\frac{1}{16}$ of the full signal range (100 IRE) with 100% modulation depth at fs/2 (i.e., at 8 bits and 256 gray levels, the FClevel is 16).

If the signal-to-noise ratio is about 26 dB, the FClevel should be increased to $\frac{1}{8}$ of the full range in order to prevent undesired color killing. The signal-to-noise ratio is unweighed over a bandwidth of fs/2 and is measured on the Green signal.

If the white balance is located after the smart Green processing, the Red and Blue false color results have to be divided by awbR and awbB, respectively, the white balance Red and Blue gain controls, in order to prevent Red and Blue from being twice corrected to white in the case of false color killing. In that case and with the false color boolean set true, it then holds for the false color elimination that:

Red=Gc/SmartGawbR, and

Blue=Gc/SmartGawbB.

Figure 8:
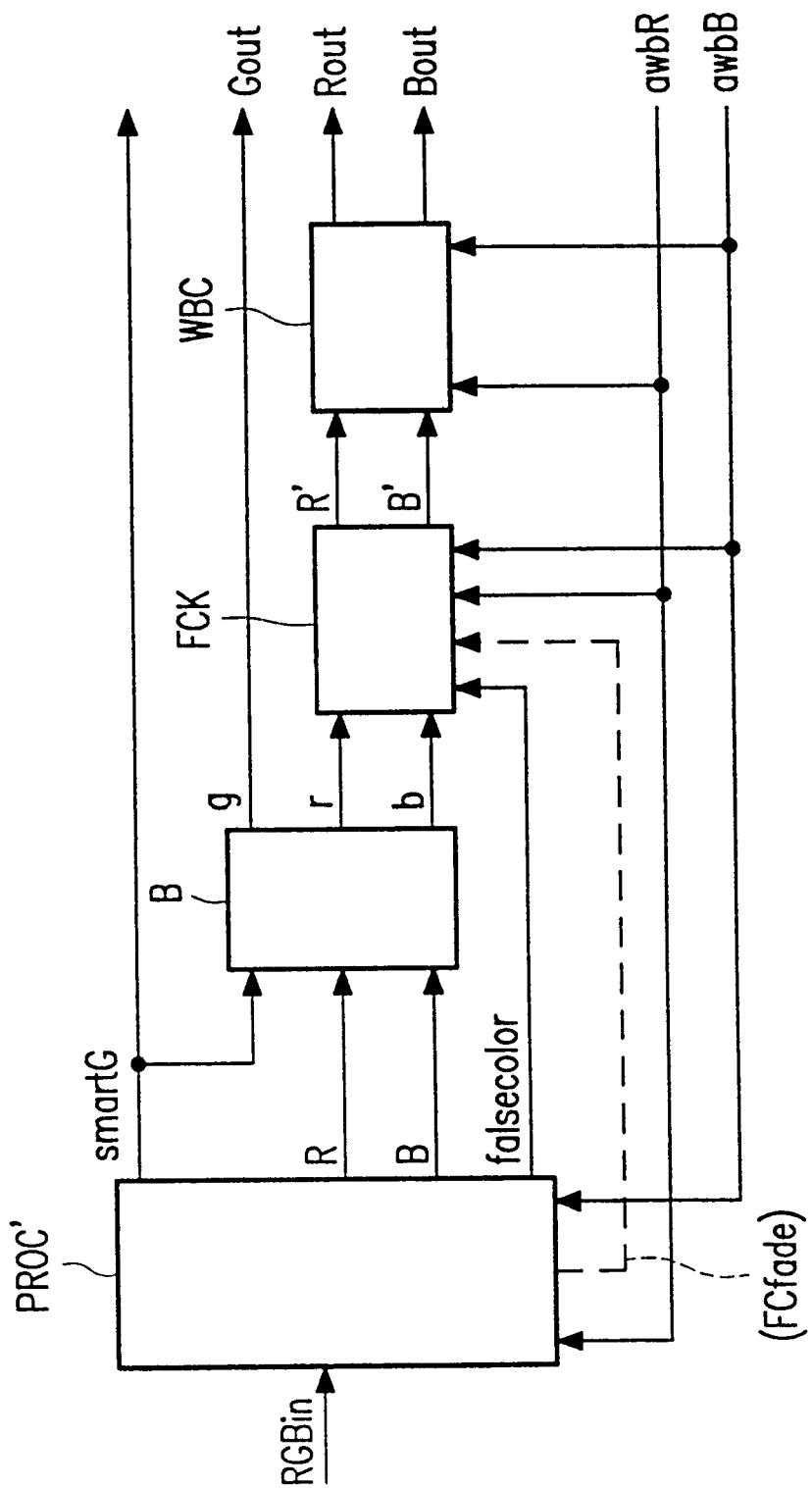
FIG. 8 shows a first embodiment of a color sample interpolator with a false color killer.

FIG. 8 shows a first embodiment of a color sample interpolator with false color killer. The RGB input signal RGBin from the sensor is applied to a processor PROC' which carries out the RGB reconstruction, using the smart-Green algorithm to obtain green, and detects the presence of false colors (output boolean falsecolor). The red signal R, the blue signal B, and the boolean falsecolor from the processor PROC' are applied to a false color killer circuit FCK to obtain a corrected red signal R' and a corrected blue signal B'. The signals R' and B' are applied to the white balance control circuit WBC to obtain the red output signal Rout and the blue output signal Bout. As discussed above, a color matrix B (with coefficients b11 thru b33 as set out above) is preferably inserted between the RGB and smart- Green processor and false color detector PROC', and the false color killer FCK. A red output signal r and a blue output signal b of the color matrix B are supplied to the false color killer FCK, while a green output signal g of the color matrix, together with the smartGreen output signal of the processor PROC', form the green output signal Gout of the circuit of FIG. 8. It will be shown by means of FIG. 9B how the two green signals smartG and g are to be processed.

FC2: False Color Elimination by Fading at the SmartG Location

If the falsecolor boolean is true, then the fading algorithm is:

FCfade=abs(Gc-sigmaG)/FCfadelevel

R-Y=(1-FCfade)*(Red-Gc), and B-Y=(1-FCfade)* (Blue-Gc)

Red=R-Y+Gc and Blue=B-Y+Gc

The default FClevel is $1/16$ and the denominator FCfadelevel is $1/4$ of the full range of 100 IRE.

As a function of noise, the FClevel is raised to $1/8$ of the full scale value, while FCfadelevel is maintained. In that case, the Red and Blue false color results have become almost equal to the switching mode.

The denominator FCfadelevel can be proportionally adapted to the modulation depth of the total MTF, similarly as would be done with FClevel.

With the white balance control after smartG and false color, the Red and Blue results also have to be divided by SmartGawbR and SmartGawbB, respectively. See FIG. 8 and note the dashed FCfade connection to the fading false color killer.

FC3: False Color Elimination by Switching at the R-Y/B-Y Location

For FC3 and FC4, it is supposed that the white balance control is executed before the false color elimination at the R-Y/B-Y or U/V location. This means that it is not necessary to take the white balance into further account and that no divider circuits are needed:

Red=Gc/SmartGawbR, and

Blue=Gc/SmartGawbB.

For all of the four elimination possibilities FC1 thru FC4, it holds that the false color detection is performed at the smartG location under the same condition:

'if abs(Gc-sigmaG)>FCgain*FClevel, then etcetera'.

The same adjustments for FCgain and FClevel hold as mentioned before, as well as the same transfer characteristic for Red and Blue as a function of Gc.

With the falsecolor boolean being true, the following action takes place at the R-Y/B-Y location:

R-Y=0 and B-Y=0, (or U=0 and V=0)

FC4: False Color Elimination by Fading at the R-Y/B-Y Location

If the falsecolor boolean is true, the following fading action takes place:

FCfade=abs(Gc-sigmaG)/FCfadelevel

U'=(1-FCfade)*U

V'=(1-FCfade)*V

For FCfade=1, the color difference signals become zero.

Figure 9A:
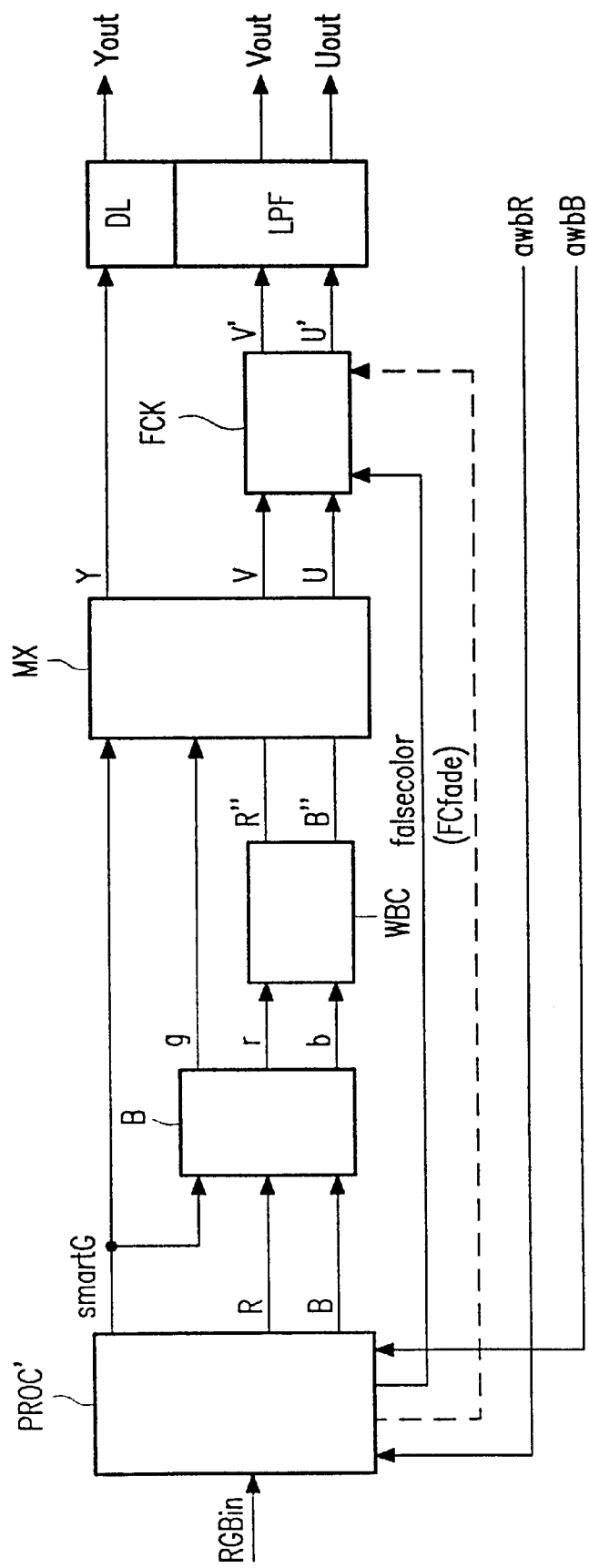
FIGS. 9A and 9B show second and third embodiments of a color sample interpolator with a false color killer.

Inclusive of the dashed FCfade line, FIG. 9A shows the block diagram of this FC4 method. The RGB input signal RGBin from the sensor is applied to a processor PROC' which carries out the RGB reconstruction using the smart-Green algorithm to obtain green, and detects the presence of false colors (output boolean falsecolor). The red signal R and the blue signal B from the processor PROC' are applied to the white balance control circuit WBC to obtain a red signal R" and a blue signal B'. A matrix circuit MX converts the green signal smartG from the processor PROC', and the red signal R" and the blue signal B", into a luminance signal Y and chrominance signals V and U. The matrix MX preferably also carries out a gamma correction operation. A false color killer circuit FCK' corrects the chrominance signals V and U in dependence upon the boolean falsecolor to obtain corrected chrominance signals V' and U' which are low-pass filtered by a low-pass filter LPF to obtain output chrominance signals Vout and Uout. The luminance signal Y from the matrix circuit MX is subjected to a corresponding delay in a delay circuit DL which supplies the output luminance signal Yout. As discussed above, a color matrix B (with coefficients b11 thru b33 as set out above) is preferably inserted between the RGB and smartGreen processor and false color detector PROC', and the white balance control circuit WBC. A red output signal r and a blue output signal b of the color matrix B are supplied to the white balance control circuit WBC, while a green output signal g of the color matrix, together with the smartGreen output signal of the processor PROC', is supplied as a green input to the matrix circuit MX. It will be shown, by means of FIG. 9B, how the two green signals smartG and g are to be processed.

Figure 9B:
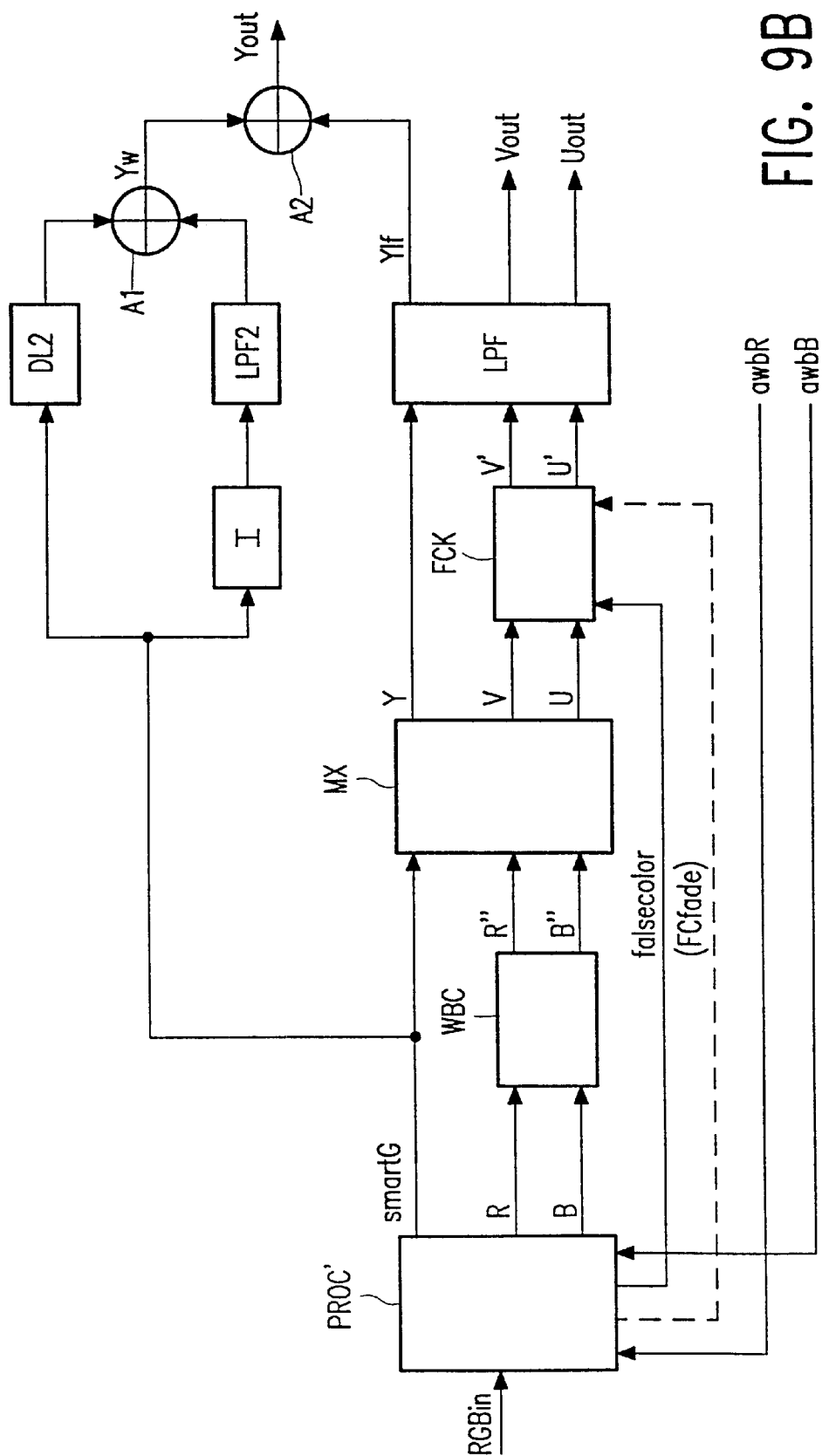

FIG. 9B shows an alternative to the embodiment of FIG. 9A; the differences between FIGS. 9A and 9B will be discussed. FIG. 9B has no color matrix B. The delay circuit DL is absent; the output signal Y of the matrix MX is also low-pass filtered by the low-pass filter LPF, which furnishes a low-pass filtered luminance signal Ylf. The smartGreen output signal smartG of the processor PROC' is not only applied to the matrix MX, but also to a high-frequency white-processing unit I, LPF2, DL2, A1 which furnishes a high-frequency white luminance signal Yw. An adder A2 sums the high-frequency white luminance signal Yw and the low-pass filtered luminance signal Ylf to obtain the output luminance signal Yout.

The reasons for providing the high-frequency white-processing unit I, LPF2, DL2, A1 are as follows. In general it holds that in the case of sensor types with a high-resolution green signal (such as the Bayer sensor types), the luminance signal contains only 59% of this high-resolution (smart) green signal, because the luminance signal is obtained by summing 0.59*G, 0.3*R and 0.11*B. This reduction of the amplitude of the frequency transfer characteristic will cause a clearly visible decreasing sharpness reproduction. This disadvantage can be avoided by means of the high-frequency white-processing unit I, LPF2, DL2, A1. The high-frequency part of the smartGreen signal smartG is added to the low-pass filtered luminance signal Ylf to obtain an output luminance signal Yout which has the full resolution. The high-frequency part of the smartGreen signal smartG is obtained by means of an inverter I, the output signal of which is low-pass filtered by a low-pass filter LPF2 to obtain an inverted low-pass filtered smartGreen signal. A delay circuit DL2 delays the smartGreen signal smartG over a delay corresponding to the processing delays of the inverter I and the low-pass filter LPF2. An adder A1 sums the output signal of the low-pass filter LPF2 and the delay DL2 to obtain the high-frequency white luminance signal Yw. If the adder A1 is replaced by a subtracter, there is, of course no need for the inverter I.

In the embodiment of FIG. 8, the green output signal g of the color matrix B and the output signals Rout and Gout of the white balance control circuit WBC are applied to a conventional RGB to YUV matrix circuit (not shown), to obtain a luminance signal and chrominance signals. The smartGreen signal smartG is high-pass filtered by a high-frequency white-processing unit I, LPF2, DL2, A1 of the type shown in FIG. 9B, the output signal Yw of which is added to the luminance signal obtained by the RGB-to-YUV matrix to obtain an output luminance signal. In the embodiment of FIG. 9A, the matrix circuit MX comprises a conventional RGB-to-YUV matrix circuit which converts the output signal g of the color matrix B and the output signals R" and B" of the white balance control circuit WBC into a luminance signal and the chrominance signals V and U. The smartGreen signal smartG is high-pass filtered by a high-frequency white-processing unit I, LPF2, DL2, A1 of the type shown in FIG. 9B, the output signal Yw of which is added to the luminance signal obtained by the RGB-to-YUV matrix to obtain the luminance signal supplied by the matrix MX.

An evaluation of the false color elimination in accordance with the invention results in the following considerations. As regards the minimum FClevel of the false color detector, the false color elimination requires a relatively large level in order to avoid undesired and clearly visible color killing actions which look like defect pixels. In simulations at 100% modulation depth at fs/2, a minimum FClevel of 1/16 of 100 IRE for the absence of Gc and of 1/8 for the presence of Gc is required. Here, it also holds that at a lower total modulation depth at fs/2, the FClevels can be decreased proportionally.

As regards a switching or fading false color killer, the fading version is slightly in favor when the perception results of the switching and fading false color elimination are compared. The differences can be noticed only in a very few pictures.

As regards the best performing false color killer location, the R-Y/B-Y location is slightly in favor when the locations of the false color killer are compared, because in the case of an undesired color killing action, the LPF will smear it out to a less visible artifact. Another advantage of the R-Y/B-Y location is that no divider circuits are needed (Red=Gc/SmartGawbR and Blue=Gc/SmartGawbB).

As regards the influence of SmartGainR/B on the false color killer, simulations have proved that these parameters, if larger than one, start improving the performance of the false color killer as far as less undesired color killing actions are concerned.

As regards only false color elimination in the presence of center Green, it is not possible to eliminate false colors at the missing Green pixel. However, without smart Green, the false color elimination in the presence of Green only offers a reduction of the total amount of aliasing of 50%.

Figure 10:
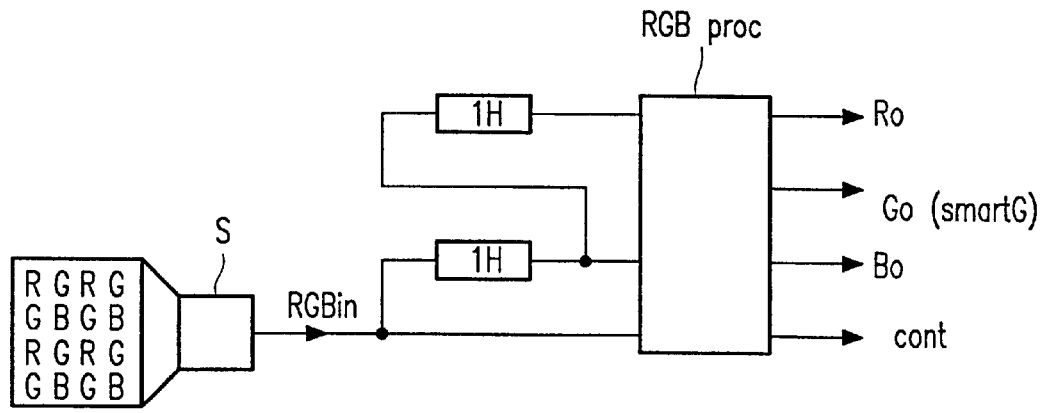
FIG. 10 shows an embodiment of a camera comprising a sensor and a first embodiment of a color sample interpolator using smart green processing and contour signal generation.
Figure 11:
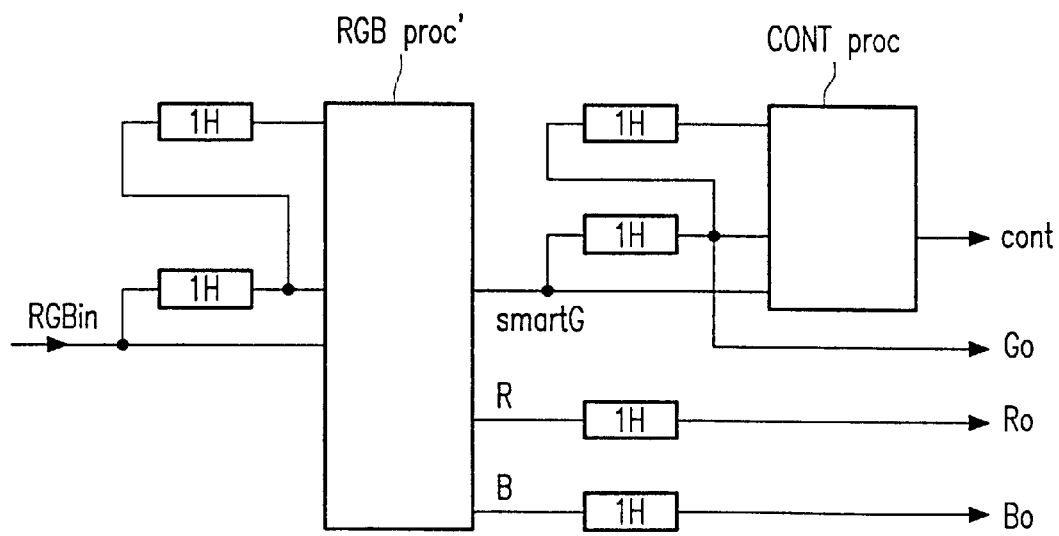
FIG. 11 shows a second embodiment of a color sample interpolator using smart green processing and contour signal generation.

FIG. 10 shows a simplified diagram of a camera comprising a sensor S with an RGB Bayer filter in accordance with FIG. 1A, and a parallel 2D Laplacian contour and RGB processing for an RGB Bayer sensor inclusive of smart Green. The contour signal is achieved via parallel processing, preventing the need for 4 extra row delays, as can be seen in the embodiment of FIG. 11. In FIG. 10, the RGB input signal RGBin from the sensor S with the RGB Bayer color filter of FIG. 1A is applied directly, and thru a first and a second horizontal row delay (1H) to inputs of an RGB (smartGreen) and parallel contour processor RGBproc, which furnishes the RGB output signals Ro, Go and Bo, as well as a contour signal cont.

As the smart Green signal offers the full horizontal and vertical resolution of the RGB Bayer image sensor, it is possible to apply a contour filter with more gain near fs/2. In that case, however, the smart Green signal needs to be supplied to the contour filter instead of the Green signal of the sensor. However, for that purpose, the smart Green signal has to be available first, which means that the contour processing has to be performed after the RGB reconstruction.

The diagram of FIG. 11 shows that, at first sight, this processing method needs 4 extra row delays, two for the contour filter and two for the Red and Blue delay adaptation to the smart Green (Go) and the contour signal. The total number of row delays has become 6. In FIG. 11, the RGB input signal RGBin is applied directly, and thru a first and a second horizontal row delay (1H) to inputs of an RGB (smartGreen) RGBproc', which furnishes a red signal R, a blue signal B, and a green signal smartG obtained in accordance with the smartGreen algorithm described above. A contour processor CONTPROC receives the green signal smartG as well as a once and twice row-delayed version of the green signal smartG, and furnishes the contour signal cont. The once-delayed version forms the green output signal Go, while the signals R, B from the RGB processor RGBproc' are once delayed to obtain a red output signal Ro and a blue output signal Bo in synchronism with the green output signal Go.

Figure 12:
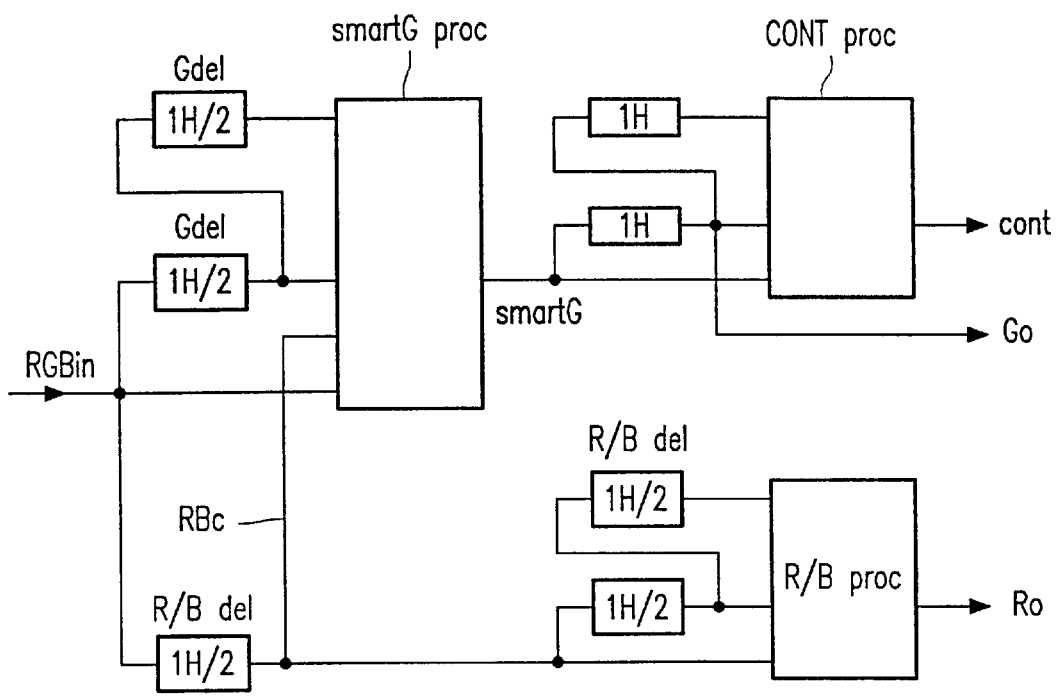
FIG. 12 shows a third embodiment of a color sample interpolator using smart green processing and contour signal generation.

Thanks to the Bayer structure of the RGB pixels, it is, however, possible to reduce the number of row delays. FIG. 12 shows a serial contour processing with the smart Green signal and a total number of row delays of 4.5 instead of 6 as in the embodiment of FIG. 11. Note that a 1H row delay contains the same number of pixels as the sensor has on one row and shifts with the full clock speed, while a 1H/2 row delay contains half that number of pixels and shifts with only half the full clock speed.

In FIG. 12, the multiplexed RGBin signal is offered to a 1H/2 RB row delay R/Bdel which samples, stores and shifts only the Red or the Blue data pixel depending on what sensor row has been read out. The input signal RGBin is also connected to the smart Green processor smartGproc and to two serial 1H/2 Green delays Gdel. For the latter, it holds that only the Green data pixels are sampled, stored and shifted. For all inputs to the smart Green processor smartGproc, so also the RBc signal, it holds that they are first processed with a zero switch box, resulting in the following full clock speed RBc and Green pixel data.

For RBc:
RORORO
OBOBOB, etc.,
For Green:
OGOGOG
GOGOGO, etc.

Note that such a zero switch box, for Red and Blue data only, is also used at the input of the R/B processor R/Bproc, resulting in the reconstructed Red and Blue output signals Ro, Bo.

The smart Green signal smartG from the smart Green processor smartGproc is applied to the two row delay contour processor CONTPROC. A total number of 4.5 row delays is needed in the embodiment of FIG. 12.

Figure 13:
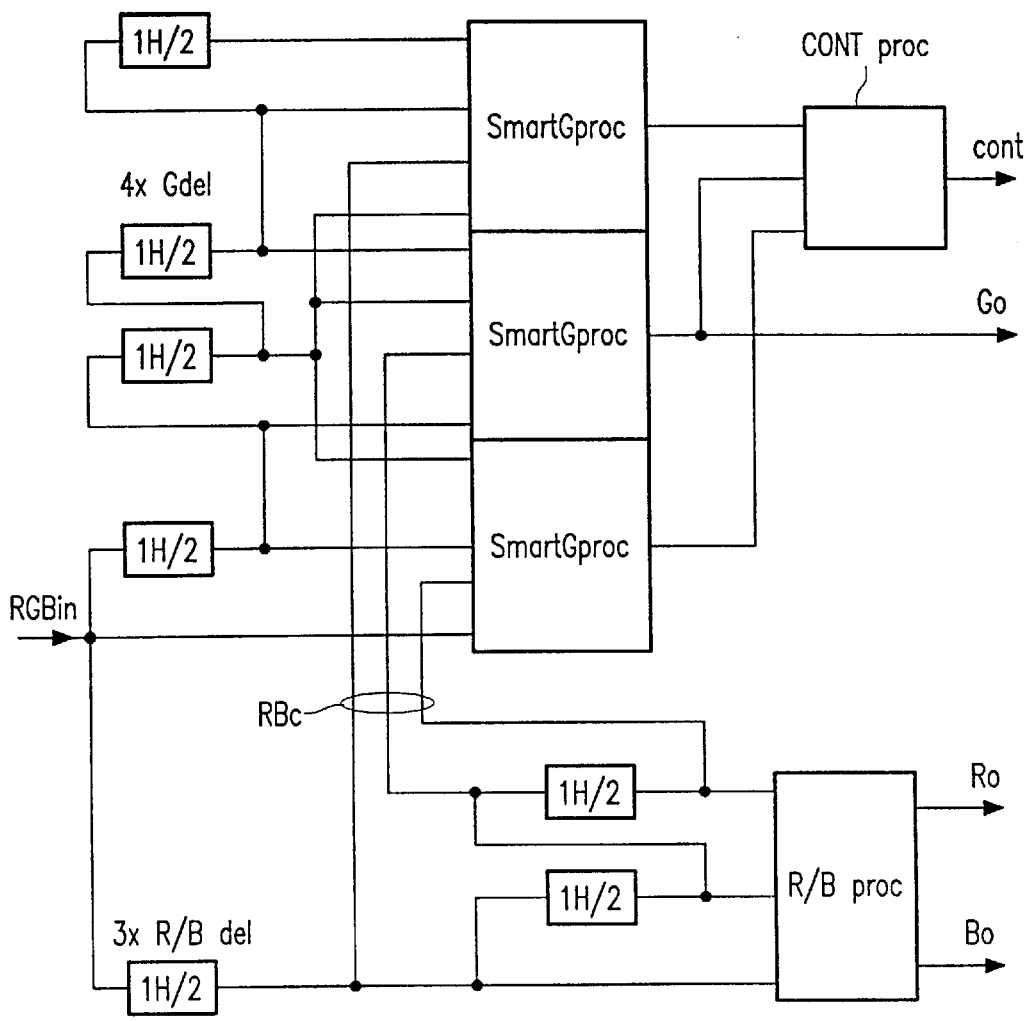
FIG. 13 shows a fourth embodiment of a color sample interpolator using smart green processing and contour signal generation.

In the embodiment of FIG. 12, one single smart Green processor smartGproc has been used. FIG. 13 shows an embodiment with three parallel smart Green processing blocks, in which only 3.5 row delays are needed for contour processing with the smart Green signal. The smart Green processors smartGproc and also the R/B processor R/Bproc have a zero switch box at the input. The zero switch box for the upper and lower smart Green block have the same timing. The 3 row-delayed RBc signals are obtained from the RBc row delays R/Bdel before the RBc processing. Note that if the smart Green processing is executed with the sorting algorithm, each smart Green block needs its own multiplier for the product RBc*SmartawbX (X stands for a Red or Blue RBc signal). The parameters SmartawbR and SmartawbB also include the SmartGainX parameter. SmartawbR or SmartawbB is selected in each smart green block and depends on the presence of a Red or Blue RBc signal.

An improved false color detector can be added to the 2D Laplacian contour processing block CONTPROC in FIGS. 11–13. For detecting false colors, the smallest possible detection area can now be used. Two different detection areas are needed in the false color detector as described above, one for the location where Green is present (FIG. 7A) and one for the location where Green is absent (FIG. 7B), but where the reconstructed smart Green is available. Since, due to the extra row delays, the smart Green signal smartG is available at every location of both detector types, it is possible to use only the best, being the one of FIG. 7B.

If the center Green pixel Gc is a reconstructed smart Green pixel, it is surrounded by four existing Green pixels. However, if the center Green pixel is an existing Green pixel, then it is surrounded by four reconstructed smart Green pixels. As set out above, it holds for the false color detector that:

SigmaG=(G1+G2+G3+G4)/4, the average Green value. The false color detection condition is fulfilled if abs(Gc-sigmaG)>FCgain*FClevel.

The FClevel value depends on the total modulation depth near fs/2 caused by the lens, a possible optical low-pass and the sinc function of the light-sensitive window of the pixel. The FClevel should therefore be adjustable as a function of the total modulation depth of each camera type at fs/2.

The FCgain parameter has become unity now because the detector has become independent of the presence of a reconstructed smart Green pixel or an existing Green pixel. Since the detector no longer needs a larger FCgain factor as a function of the presence of Green, the false color detection algorithm will be improved. The FCgain parameter, being unity, is no longer needed.

If the false color detection is fulfilled, then a boolean referred to as "falsecolor" is set to be true. If this condition is not fulfilled, this boolean is set to be false. The falsecolor boolean, if true, is used for the false color elimination action itself, and also for the calculation of the fader value when the false color elimination is executed with a fader.

A primary aspect of the present invention can be summarized as follows. Digital still color cameras with only one single area image sensor have to distribute the color pixels across the available light-sensitive area of the sensor. Many color filter arrays are possible with the primary Red-Green-Blue and complementary Yellow-Magenta-Cyan colors. But whatever the array is, it will result in resolution losses and in colored aliasing artifacts when compared with a three-sensor RGB camera of which each sensor has the same amount of pixels as the single color sensor.

In terms of minimum loss of resolution and a minimum of colored aliasing, one of the best color filter arrays, is the RGB Bayer color filter. One row of this filter has a horizontal RG repeating color pixel sequence and the next row has a GB sequence, and so forth.

Smart green processing is a method of improving the resolution of the green signal in the horizontal and vertical directions. Apart from the color reproduction, the object of smart green processing is, to approximate very closely the quality of a three-sensor RGB camera, in other words, providing true VGA, XGA or whatever size with a single RGB Bayer sensor color camera.

The following features are preferably present. The smart Green (=missing pixel) reconstruction algorithm by means of the sorting, fading and simple fading algorithm for several sensor types like RG/GB- and YG/GC Bayer, RGG/GGB- and RGGG,GGBG-types, for two-sensor cameras with a Green and an RB/BR sensor (smart reconstruction of R and B). The correction of the near-white area with extra gain for the Red and Blue signal in the smart Green reconstruction algorithm. The correction of the missing pixel value with the white balance parameters.

A further aspect of the invention can be summarized as follows. Red-Green-Blue (RGB) or Yellow-Green-Cyan (YGC) Bayer color arrays suffer from colored aliasing (false colors) which is caused by the limited Nyquist area of the RB or YC pixels. Half the contribution of the total aliasing can be eliminated by means of a false color detector using the center Green pixel and the other four diagonally surrounding Green pixels. No false color detection is possible at the missing Green location. However, when using the missing pixel reconstruction as described above, the second part of the colored aliasing can be eliminated with the same algorithm and using the horizontal and vertical surrounding pixels. The result is that the colored aliasing in a test scene like a zoneplate is completely killed. In normal scenes, not all but much aliasing is killed.

The following features are preferably present. The elimination of false colors at the location where Green is present and where Green is absent, inclusive of the adaptation of the false color levels for each. Note that the smart Green reconstruction algorithm is required first at the missing Green location. The switching and the fading color killer method. The adaptation of the false color killer level as a function of the overall Modulation Transfer Function of the lens, optical low-pass filter and light-sensitive window of the sensor. The adaptation of the result of the false color killer when it is executed before the white balance. The application of a diagonal optical low-pass filter for higher optical resolution in the case of smart Green with its false color killer.

Another aspect of the invention can be summarized as follows. An improved contour processing and an improved false color killer, both with the smart Green signal for RGB Bayer sensors, are based on the following considerations. The Nyquist domain of the conventional Green processing of an RGB Bayer sensor does not allow much amplification near half the sample frequency in the horizontal and vertical directions. Since the smart Green signal offers the full resolution for near-white colors, it has become possible to apply a conventional two-dimensional laplacian contour filter afterwards. As there is hardly any distortion in the smart Green signal, this contour filter is allowed to amplify nearly half the sample frequency in the horizontal and vertical directions. At first sight, this solution will require four extra row delays when a contour filter with 2 row delays is used. In accordance with a feature of this invention, a two-dimensional Laplacian contour signal can be obtained with only one and a half extra row delays in the smart Green and Red/Blue processing. Moreover, it offers the possibility of using a false color detector with the smallest pitch for all pixels.

The following features are preferably present. The use of the smart Green signal for contour processing (see, for example FIG. 11). The 4.5 row delay circuit for combining the smart Green and the contour processing as described in FIG. 12. The 3.5 row delay circuit, with 3 smart Green processing blocks, for executing contour processing with smart Green as shown in FIG. 13. The improved false color detector using the same smallest possible detection area.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer. In the device claim enumerating several means, several of these means can be embodied by one and the same item of hardware.

It should be noted that the embodiment of FIG. 13 is also covered by the claims of a copending patent application Ser. No. 09/115,892 having the same priority date.

What is claimed is:

1. A method of interpolating a color sample in a signal having alternately colored samples, the method comprising the steps:

providing neighboring color samples of the same color as the color sample to be interpolated;

providing a single differently colored sample from the same location as the color sample to be interpolated; and interpolating the color sample to be interpolated in dependence upon the neighboring color samples of the same color and the single differently colored sample from the same location, to furnish an interpolated color sample, wherein said interpolating step comprises the steps:

determining a horizontal average of horizontally neighboring color samples of the same color as the color sample to be interpolated;

determining a vertical average of vertically neighboring color samples of the same color as the color sample to be interpolated; and furnishing a median of said horizontal average, said vertical average, and said differently colored sample from the same location.

2. A method of interpolating a color sample in a signal having alternately colored samples, the method comprising the steps:

providing neighboring color samples of the same color as the color sample to be interpolated;

providing a single differently colored sample from the same location as the color sample to be interpolated; and interpolating the color sample to be interpolated in dependence upon the neighboring color samples of the same color and the single differently colored sample from the same location, to furnish an interpolated color sample, wherein said interpolating step comprises the steps:

determining a horizontal average of horizontally neighboring color samples of the same color as the color sample to be interpolated;

determining a vertical average of vertically neighboring color samples of the same color as the color sample to be interpolated; and calculating a weighed average of said horizontal average, said vertical average, in dependence upon said differently colored sample from the same location.

3. A method of interpolating a color sample in a signal having alternately colored samples, the method comprising the steps:

providing neighboring color samples of the same color as the color sample to be interpolated;

providing a differently colored sample from the same location as the color sample to be interpolated; and interpolating the color sample to be interpolated in dependence upon the neighboring color samples of the same color and the differently colored sample from the same location, to furnish an interpolated color sample, said interpolating step comprising multiplying said differently colored sample from the same location by a white balance adjustment factor before said differently colored sample is taken into account, wherein said method further comprises the step:

correcting the white balance adjustment factor by a matrix which Is an inverse of a color matrix for a camera providing the signal having alternately colored samples.

\* \* \* \* \*

UNITED STATES PATENT AND TRADEMARK OFFICE
CERTIFICATE OF CORRECTION

PATENT NO. : 6,697,110 B1
DATED : February 24, 2004
INVENTOR(S) : Jaspers et al.

It is certified that error appears in the above-identified patent and that said Letters Patent is hereby corrected as shown below:

<u>Title page,</u>
Item [73], Assignee, please insert:
-- [73] Assignee: Koninklijke Philips Electronics N.V., Eindhoven (NL) --.

Signed and Sealed this

First Day of June, 2004

JON W. DUDAS
*Acting Director of the United States Patent and Trademark Office*